United States Patent
Li et al.

(10) Patent No.: US 9,369,863 B2
(45) Date of Patent: Jun. 14, 2016

(54) METHOD AND CORRESPONDING APPARATUS, COMPUTER PROGRAM PRODUCT TO VALIDATE AN EUICC SUBSCRIPTION CHANGE

(71) Applicant: Telefonaktiebolaget L M Ericsson (publ), Stockholm (SE)

(72) Inventors: Qiang Li, Täby (SE); Justus Petersson, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 161 days.

(21) Appl. No.: 14/237,780

(22) PCT Filed: Nov. 29, 2013

(86) PCT No.: PCT/SE2013/051420
§ 371 (c)(1),
(2) Date: Feb. 7, 2014

(87) PCT Pub. No.: WO2015/080640
PCT Pub. Date: Jun. 4, 2015

(65) Prior Publication Data
US 2015/0334552 A1 Nov. 19, 2015

(51) Int. Cl.
*H04W 8/18* (2009.01)
*H04W 4/00* (2009.01)

(52) U.S. Cl.
CPC .............. *H04W 8/183* (2013.01); *H04W 4/005* (2013.01)

(58) Field of Classification Search
CPC ............................... H04W 8/183; H04W 4/005
See application file for complete search history.

(56) References Cited

U.S. PATENT DOCUMENTS

| 2012/0264400 | A1 | 10/2012 | Khan et al. | |
|---|---|---|---|---|
| 2013/0165073 | A1* | 6/2013 | Madsen | H04W 12/06 455/411 |
| 2014/0235210 | A1* | 8/2014 | Park | H04W 12/04 455/411 |
| 2014/0237101 | A1* | 8/2014 | Park | H04L 67/303 709/223 |

(Continued)

FOREIGN PATENT DOCUMENTS

WO  2012085593 A1  6/2012

OTHER PUBLICATIONS

GSM Association, "Embedded SIM Task Force Requirements and Use Cases", Non-Confidential White Paper, Feb. 21, 2011, pp. 1-38, version 1.0, GSMA.

(Continued)

*Primary Examiner* — Paul H Masur
(74) *Attorney, Agent, or Firm* — Coats & Bennett, PLLC

(57) ABSTRACT

A connectivity service platform in a communication network manages changes to subscriptions for radio devices. When the connectivity service platform receives a subscription change message, it sends instructions to a radio device to change from the currently enabled subscription to a second subscription for its network connection. The connectivity service platform tests the second subscription network connection using a pre-defined testing procedure. More particularly, the test is performed uses a network connection from the second subscription to send and receive test messages to verify that the second subscription network connection has passed the testing. The first subscription is then disabled and the second subscription is enabled.

14 Claims, 5 Drawing Sheets

(56) References Cited

U.S. PATENT DOCUMENTS

| | | | | |
|---|---|---|---|---|
| 2014/0287725 A1* | 9/2014 | Lee | H04L 63/0853 | 455/411 |
| 2014/0329502 A1* | 11/2014 | Lee | H04W 12/06 | 455/411 |
| 2015/0105075 A1* | 4/2015 | Yu | H04W 8/18 | 455/435.2 |
| 2015/0105080 A1* | 4/2015 | Jin | H04W 8/12 | 455/436 |
| 2015/0110035 A1* | 4/2015 | Lee | H04W 8/18 | 370/329 |
| 2015/0223136 A1* | 8/2015 | Gao | H04W 36/14 | 455/436 |
| 2015/0237496 A1* | 8/2015 | Gao | H04W 8/205 | 455/414.1 |
| 2015/0237551 A1* | 8/2015 | Jin | H04W 36/14 | 370/331 |

OTHER PUBLICATIONS

Exalted, "Expanding LTE for Devices", Large Scale Integrating Project, FP7 Contract No. 258512, WP5—Security, Authentication & Provisioning, Deliverable 5.1, Feb. 29, 2012, pp. 1-115, version 1.0.

GSM Association, "Remote Provisioning Architecture for Embedded UICC", Jul. 1, 2013, pp. 1-82, version 1.43, GSM Association.

European Telecommuications Standsrds Institute, "Smart Cards; Machine to Machine UICC; Physical and logical characteristics (Release 9)", Technical Specification, ETSI TS 102 671 V9.1.0, Sep. 1, 2011, pp. 1-21, ETSI, France.

European Telecommuications Standsrds Institute, "Smart Cards; Embedded UICC; Requirements Specification (Release 12)", Technical Specification, ETSI TS 103 303 V12.2.0, Sep. 1, 2013, pp. 1-20, ETSI, France.

* cited by examiner

Fig. 5a

50 Receiving subscription change message
↓
51 Sending subscription change message
↓
52 Enabling 2nd subscription
↓
53 Testing
↓
54 Verifying
↓
55 Disabling 1st subscription

Fig. 5b

56 Storing testing procedure
↓
57 Sending testing procedure message
↓
50 Receiving subscription change message
↓
51 Sending subscription change message
↓
52 Enabling 2nd subscription
↓
53 Testing
↓
54 Verifying
↓
58 Receiving verification message
↓
55 Disabling 1st subscription

Fig. 6a

60 Receiving subscription change message
↓
61 Enabling 2nd subscription
↓
62 Testing
↓
63 Verifying
↓
64 Disabling 1st subscription

Fig. 6b

65 Receiving testing procedure
↓
66 Storing testing procedure
↓
60 Receiving subscription change message
↓
61 Enabling 2nd subscription
↓
62 Testing
↓
63 Verifying
↓
67 Receiving verification message
↓
64 Disabling 1st subscription

METHOD AND CORRESPONDING APPARATUS, COMPUTER PROGRAM PRODUCT TO VALIDATE AN EUICC SUBSCRIPTION CHANGE

TECHNICAL FIELD

The present disclosure relates to methods and devices of a communication network for managing subscriptions for wireless connection of a radio device having an embedded Universal Integrated Circuit Card (eUICC).

BACKGROUND

Unlike a traditional UICC Subscriber Identity Module (SIM) card used in a consumer device, e.g. a mobile phone, all eUICC that are deployed in e.g. Machine-to-Machine (M2M) solutions and embedded into the M2M device cannot easily be accessed by human intervention to switch the SIM card manually during the device life cycle. According to the Global System for Mobile Communications (GSM) Association (GSMA) eUICC standard (GSMA "Remote Provisioning Architecture for Embedded UICC" DRAFT 1.39 29 Apr. 2013) and European Telecommunications Standards Institute (ETSI) eUICC Standard (EXALTED "Expanding LTE for Devices" FP7 Contract Number: 258512, Feb. 29, 2012), all eUICC shall be delivered with a pre-installed provisioning subscription for remote provisioning/bootstrapping purpose (i.e. a provisioning/bootstrapping operator provides initial bootstrapping connectivity for eUICC in order to enable late binding feature i.e. to remotely provision the $1^{st}$ eUICC operational subscription to the eUICC when the device (e.g. a car) comprising the eUICC is shipped from initial manufacturer country to the destination country ($1^{st}$ operational subscription could be provided by the local operator from the destination country), and then later to change the eUICC active operational subscription from the current operator subscription to an new operator (due to the location being changed to another country, or changed operator subscription) during the device/eUICC long life cycle (15-20 years), in order to avoid high roaming fee and/or single operator lock-in situation during the device long life cycle e.g. in the automotive industry or for smart metering/security cameras etc.

However, eUICC connectivity may be lost permanently during subscription management lifecycle, e.g. when changing from an old subscription to a new subscription, for providing the eUICC device with a network connection, and the new subscription does not function properly. There are many reasons why the new subscription may not function properly. For instance, the new subscription credentials may not have been installed correctly in the eUICC and/or the network home location register (HLR), during the subscription provisioning or downloading/installation phase; the new subscription may be in a deactivated status in the network; the new subscription doesn't have a roaming agreement in the current located area; etc. In these cases, the eUICC will lose cellular connectivity immediately after subscription change process when the new subscription is enabled and the old subscription is disabled, and once the eUICC loses cellular connectivity, it will lose cellular connectivity permanently. The only way may be to ship the eUICC/device back to the SIM vendor's trusted secure factory to re-provision an available subscription via wired or non-cellular wireless connectivity, so that the eUICC can regain the cellular connectivity and connect to a cellular network.

Chapter 3.5.12 "Fall-Back Mechanism" of GSMA "Remote Provisioning Architecture for Embedded UICC" DRAFT 1.39 29 Apr. 2013 states that in the event of loss of network connectivity, as detected by the device, there is a need to change to the profile with fall-back attribute set. In this case the eUICC disables the currently enabled Profile (Profile A) and enables the Profile with Fall-back Attribute set (Profile B). The device reports network loss to the eUICC. The eUICC is configured to perform the fall-back mechanism if certain network connectivity issues are reported by the Device.

SUMMARY

It has been realised that it may be difficult to fall back since the radio device has lost network connectivity and may not have an active secondary subscription to fall back to. It can thus not contact a wireless network of another operator to set up another subscription since it does not have network connectivity.

Subscriptions of radio devices, e.g. M2M devices, may be handled via a connectivity service platform, e.g. the Ericsson Device Connection Platform (DCP) or other hosted core network (CN) or home public land mobile network (Home PLMN or HPLMN) which may be used by several different network operators to manage subscriptions for radio devices having eUICC (since the subscriptions are not handled manually by inserting a UICC card in the device). Thus, a host may host a multi-tenant home location register (HLR) and other core network nodes (Gateway General Packet Radio Service (GPRS) support node (GGSN), short message service centre (SMSC), etc.) in HPLMN as a core network service for all customer operators. All the M2M subscribers of the operators are registered and stored on hosted HLR. Connectivity is provided as a service to all operators hosted on the platform. On top of the core network service, also a cloud business support system (BSS) may be hosted to provision and manage subscriber data, processes, billing, etc. In accordance with the present disclosure, eUICC features are added in the connectivity service platform to meet the new developments within this field (eUICC for M2M connections from vehicles (cars), smart metering, security camera, and also for consumer electronics).

According to an aspect of the present disclosure, there is provided a method performed by a connectivity service platform in a communication network. The method comprises receiving a subscription change message comprising instructions for the connectivity service platform to change from a currently enabled first subscription to a second subscription for providing a network connection to a radio device comprising an eUICC. The method also comprises sending a subscription change message to the radio device, comprising instructions for the radio device to change from the currently enabled first subscription to the second subscription for its network connection. The method also comprises enabling the second subscription within the connectivity service platform, thereby enabling the connectivity service platform for communicating with the radio device via the network connection from the second subscription of the radio device instead of from the first subscription. The method also comprises testing the second subscription network connection of the radio device in accordance with a predefined testing procedure by using the network connection from the second subscription for sending at least one test message to, and receiving at least one test message from, the radio device. The method also comprises verifying that the second subscription network connection has passed the testing. The method also comprises disabling the first subscription within the connectivity service platform, after the verifying, thereby disabling the connectivity service platform from communicating with the radio device via the network connection from the first subscription of the radio device.

According to another aspect of the present disclosure, there is provided a computer program product comprising computer-executable components for causing a connectivity service platform to perform an embodiment of the method performed by a connectivity service platform, of the present disclosure, when the computer-executable components are run on processor circuitry comprised in the connectivity service platform.

According to another aspect of the present disclosure, there is provided a connectivity service platform for a communication network. The platform comprises processor circuitry, and storage storing instructions that, when executed by the processor circuitry, cause the connectivity service platform to receive a subscription change message comprising instructions for the connectivity service platform to change from a currently enabled first subscription to a second subscription for providing a network connection to a radio device comprising an eUICC. The instructions also cause the platform to send a subscription change message to the radio device, comprising instructions for the radio device to change from the currently enabled first subscription to the second subscription for its network connection. The instructions also cause the platform to enable the second subscription within the connectivity service platform, thereby enabling the connectivity service platform for communicating with the radio device via the network connection from the second subscription of the radio device instead of from the first subscription. The instructions also cause the platform to test the second subscription network connection of the radio device in accordance with a predefined testing procedure by using the network connection from the second subscription for sending at least one test message to, and receiving at least one test message from, the radio device. The instructions also cause the platform to verify that the second subscription network connection has passed the testing. The instructions also cause the platform to disable the first subscription within the connectivity service platform, after the verifying, thereby disabling the connectivity service platform from communicating with the radio device via the network connection from the first subscription of the radio device.

According to another aspect of the present disclosure, there is provided a computer program comprising computer program code which is able to, when run on processor circuitry of a connectivity service platform in a communication network, cause the connectivity service platform to receive a subscription change message comprising instructions for the connectivity service platform to change from a currently enabled first subscription to a second subscription for providing a network connection to a radio device comprising an eUICC. The code is also able to cause the platform to send a subscription change message to the radio device, comprising instructions for the radio device to change from the currently enabled first subscription to the second subscription for its network connection. The code is also able to cause the platform to enable the second subscription within the connectivity service platform, thereby enabling the connectivity service platform for communicating with the radio device via the network connection from the second subscription of the radio device instead of from the first subscription. The code is also able to cause the platform to test the second subscription network connection of the radio device in accordance with a predefined testing procedure by using the network connection from the second subscription for sending at least one test message to, and receiving at least one test message from, the radio device. The code is also able to cause the platform to verify that the second subscription network connection has passed the testing. The code is also able to cause the platform to disable the first subscription within the connectivity service platform, after the verifying, thereby disabling the connectivity service platform from communicating with the radio device via the network connection from the first subscription of the radio device.

According to another aspect of the present disclosure, there is provided a computer program product comprising an embodiment of the computer program for a connectivity service platform, of the present disclosure, and a computer readable means on which the computer program is stored.

According to another aspect of the present disclosure, there is provided a method performed by a radio device in a communication network and comprising an eUICC. The method comprises receiving a subscription change message from a connectivity service platform, comprising instructions for the radio device to change from the currently enabled first subscription to the second subscription for its network connection. The method also comprises enabling the second subscription within the radio device, thereby enabling the radio device for communicating with the connectivity service platform via the network connection from the second subscription of the radio device instead of from the first subscription. The method also comprises testing the second subscription network connection of the radio device in accordance with a predefined testing procedure by using the network connection from the second subscription for sending at least one test message to, and receiving at least one test message from, the connectivity service platform. The method also comprises verifying that the second subscription network connection has passed the testing. The method also comprises disabling the first subscription within the radio device, after the verifying, thereby disabling the radio device from communicating with the connectivity service platform via the network connection from the first subscription of the radio device.

According to another aspect of the present disclosure, there is provided a computer program product comprising computer-executable components for causing a radio device to perform an embodiment of the method performed by a radio device, of the present disclosure, when the computer-executable components are run on processor circuitry comprised in the radio device.

According to another aspect of the present disclosure, there is provided a radio device for a communication network. The radio device comprises an eUICC, processor circuitry, and storage storing instructions that, when executed by the processor circuitry, cause the radio device to receive a subscription change message from a connectivity service platform, comprising instructions for the radio device to change from the currently enabled first subscription to the second subscription for its network connection. The instructions also cause the radio device to enable the second subscription within the radio device, thereby enabling the radio device for communicating with the connectivity service platform via the network connection from the second subscription of the radio device instead of from the first subscription. The instructions also cause the radio device to test the second subscription network connection of the radio device in accordance with a predefined testing procedure by using the network connection from the second subscription for sending at least one test message to, and receiving at least one test message from, the connectivity service platform. The instructions also cause the radio device to verify that the second subscription network connection has passed the testing. The instructions also cause the radio device to disable the first subscription within the radio device, after the verifying, thereby disabling the radio device from communicating with the connectivity service platform via the network connection from the first subscription of the radio device.

According to another aspect of the present disclosure, there is provided a computer program comprising computer program code which is able to, when run on processor circuitry of a radio device in a communication network and comprising an eUICC, cause the radio device to receive a subscription change message from a connectivity service platform, comprising instructions for the radio device to change from the currently enabled first subscription to the second subscription for its network connection. The code is also able to cause the radio device to enable the second subscription within the radio device, thereby enabling the radio device for communicating with the connectivity service platform via the network connection from the second subscription of the radio device instead of from the first subscription. The code is also able to cause the radio device to test the second subscription network connection of the radio device in accordance with a predefined testing procedure by using the network connection from the second subscription for sending at least one test message to, and receiving at least one test message from, the connectivity service platform. The code is also able to cause the radio device to verify that the second subscription network connection has passed the testing. The code is also able to cause the radio device to disable the first subscription within the radio device, after the verifying, thereby disabling the radio device from communicating with the connectivity service platform via the network connection from the first subscription of the radio device.

According to another aspect of the present disclosure, there is provided a computer program product comprising an embodiment of the computer program for the radio device, of the present disclosure, and a computer readable means on which the computer program is stored.

By enabling and testing the network connection provided by the second subscription before disabling the first subscription, it is ensured that a subscription able to provide a functioning network connection is still enabled even if the new (second) subscription fails. The solution in accordance with the present disclosure may be viewed as a soft handover from one subscription to another subscription for avoiding permanent loss of connectivity of the radio device. The soft handover may be used instead of or as a compliment to a fall-back policy for handling problems with changing from a first subscription to a second subscription.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5a is a schematic flow chart of an embodiment of a method of a connectivity service platform, of the present disclosure.

FIG. 5b is a schematic flow chart of another embodiment of a method of a connectivity service platform, of the present disclosure.

FIG. 6a is a schematic flow chart of an embodiment of a method of a radio device, of the present disclosure.

FIG. 6b is a schematic flow chart of another embodiment of a method of a radio device, of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
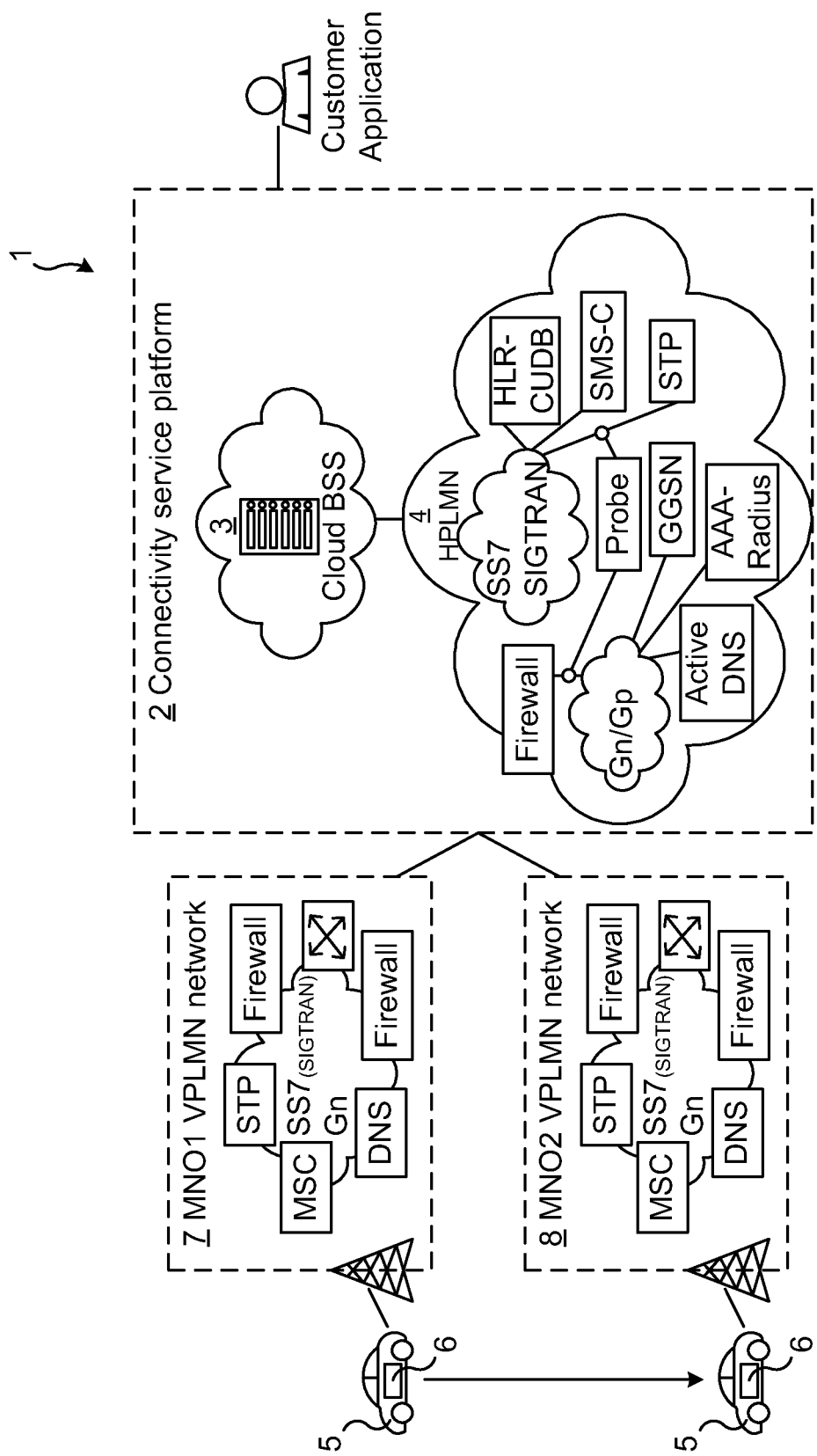
FIG. 1 is a schematic Nock diagram illustrating an embodiment of a communication network in accordance with the present disclosure.

FIG. 1 is a schematic block diagram illustrating an embodiment of a communication network 1 in accordance with the present disclosure. The communication network 1 comprises a connectivity service platform 2, e.g. an Ericsson Device Connection Platform (EDCP or DCP) for providing CN functionality for customers in the form of several different mobile network operators (MNO) for a plurality of radio devices 5 having eUICC 6, e.g. M2M devices 5. Each of the radio devices 5 may be any device or user equipment (UE), mobile or stationary, enabled to communicate over a radio cannel in a communications network, for instance but not limited to e.g. mobile phone, smart phone, modem, sensors, meters, vehicles such as cars or the like, household appliances, medical appliances, media players, cameras, or any type of consumer electronic, for instance but not limited to television, radio, lighting arrangements, tablet computer, laptop, or personal computer (PC). The connectivity service platform 2 of the embodiment of FIG. 1 comprises a cloud business support system (BSS) 3 as well as a cloud home public land mobile network (HPLMN) 4. The HPLMN 4 comprises any regular CN nodes or modules of a radio communication network, e.g. home location register (HLR), Gateway General Packet Radio Service (GPRS) support node (GGSN), short message service centre (SMSC), Signal Transfer Point (STP), Domain Name System (DNS), and authentication, authorization and accounting (AAA) RADIUS, for e.g. Signalling System 7 (SS7) and/or Integrated Services Digital Network (ISDN) communications protocols of signalling transport (SIGTRAN). The radio device 5 has a wireless connection to the network 1 and the platform 2 via a wireless connection provided by a visited PLMN (VPLMN) of a network operator 7 or 8. Each of the VPLMN also comprise the nodes and modules typical for such networks. Each operator 7, 8 has a radio access network (RAN) with base stations via which radio devices may connect wirelessly provided that they have an enabled and active subscription with the operator. Since the radio device has an eUICC, the eUICC needs to be flash updated in order to change to a new subscription for its wireless connection. Instructions for the update need typically be received via its wireless connection of an old subscription before the change to the new subscription. The new subscription, may be with the same operator 7 as the old subscription, but it may more commonly be with a new operator 8.

In some embodiments of the present disclosure, the platform 2 may store information about the predefined testing procedure, and send a testing procedure message comprising information about the predefined testing procedure to the radio device 5. Correspondingly, the radio device may in some embodiments, receive the testing procedure message comprising information about the predefined testing procedure from the connectivity service platform 2, and store the received information about the predefined testing procedure. Thus, the platform 2 may communicate the testing procedure to the radio device 5. The testing procedure of the radio device 5 is typically the same as the testing procedure of the platform 2, but it is conceivable that the testing procedure of the radio device is different than the testing procedure of the platform 2, if it is suitable to adjust the testing procedure for better conforming to the needs of the radio device 5. The testing procedure is typically communicated to the radio device before either of the platform 2 and the device 5 tests the second subscription network connection. It may be convenient that the testing procedure is the same for the platform and the radio device, since it is often important that the platform and the radio device come to the same conclusion as to whether the second subscription is verified as having passed the testing or not, such that both sides uses either the first or the second subscription after the verification.

In some embodiments of the present disclosure, the radio device 5 will send, and the platform 2 will receive, a verification message comprising information about that the second subscription network connection has passed a corresponding testing procedure performed by the radio device, before the disabling of the first subscription. This will ensure that the radio device 5 has come to the same conclusion as the platform 2 in the step of verifying, before both sides disables the first subscription. Correspondingly, the platform 2 may send, and the radio device 5 receive, a verification message comprising information about that the second subscription network connection has passed a the testing procedure performed by the platform, before the disabling of the first subscription.

In some embodiments of the present disclosure, the first subscription is with a first network operator 7, and the second subscription is with a second network operator 8, different than a first network operator 7. However, in other embodiments, the second subscription may be with the same first network operator 7 as the first subscription.

In some embodiments of the present disclosure, the test messages comprises at least one of: a downlink SMS message, an uplink SMS message, a downlink data message, an uplink data message, and a message for setting up a voice call, and combinations thereof. These are examples of test messages which may be sent and/or received by the platform 2 and the radio device 5 in order to test the network connectivity provided by means of the second subscription, in accordance with the predetermined test procedure.

Figure 2:
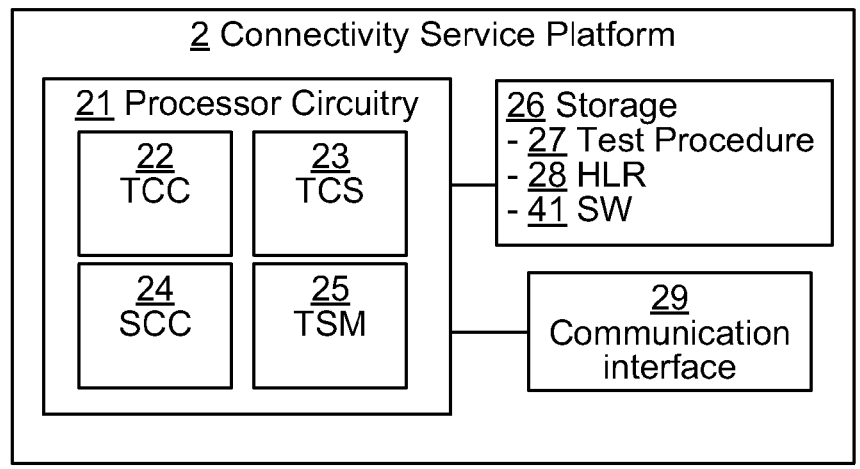
FIG. 2 is a schematic block diagram of an embodiment of a connectivity service platform of the present disclosure.

FIG. 2 is a schematic block diagram of an embodiment of a connectivity service platform 2 of the present disclosure. The platform 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor 21, e.g. an application specific integrated circuit (ASIC), a field programmable gate array (FPGA) or a complex programmable logic device (CPLD). The processor circuitry 21 is configured to run one or several computer program(s) or software 41 stored in a storage 26 e.g. comprising a memory. The processor circuitry comprises one or several modules 22-25 as a result of executing SW 41 in the storage 26, e.g. the test connectivity component (TCC) 22, a test connectivity server (TCS) 23, a subscription change component (SCC) 24 and/or a traffic and signalling monitor (TSM) 25. The TCC 22 is, in FIG. 9, as an example depicted as comprising the TCS 23 as well as the executed test procedure 27 and verification procedure 92. Each of these modules may be formed by separate or dedicated processors of the processor circuitry 21 or by a common processor. The storage 26 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the HLR 28 as well as the test procedure 27 is part of/stored in the storage 26. The processor circuitry 21 is also configured to store data in the storage 26, as needed. The platform 2 also comprises a communication interface 29 for communication with the radio device 5 as well as with other parts of the communication network 1 such as the operators 7 and 8. The communication interface may comprise a transmitter and a receiver for, in cooperation with the processor circuitry 21, sending and receiving data messages and other digital signalling.

Figure 3:
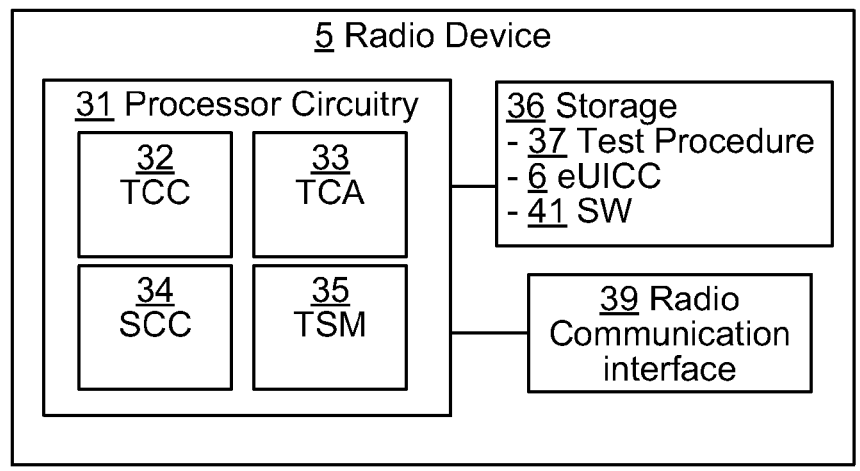
FIG. 3 is a schematic block diagram of an embodiment of a radio device of the present disclosure.

FIG. 3 is a schematic block diagram of an embodiment of a radio device 5 of the present disclosure. The radio device 5 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software 41 stored in a storage 36 e.g. comprising a memory. The processor circuitry comprises one or several modules 32-35 as a result of executing SW 41 in the storage 36, e.g. the test connectivity component (TCC) 32, a test connectivity server (TCS) 33, a subscription change component (SCC) 34 and/or a traffic and signalling monitor (TSM) 35. The TCC 32 is, in FIG. 9, as an example depicted as comprising the TCS 33 as well as the executed test procedure 37 and verification procedure 93. Each of these modules may be formed by separate or dedicated processors of the processor circuitry 31 or by a common processor. The storage 36 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the eIUCC 6 of the device 5 as well as the test procedure 37 is part of/stored in the storage 36. The processor circuitry 31 is also configured to store data in the storage 36, as needed. The radio device 5 also comprises a radio communication interface 39 for communication with the platform 2 as well as with other parts of the communication network 1 such as the operators 7 and 8. The communication interface may comprise a transmitter and a receiver, as well as an antenna, for, in cooperation with the processor circuitry 31, sending and receiving data messages and other digital signalling wirelessly.

Figure 4:
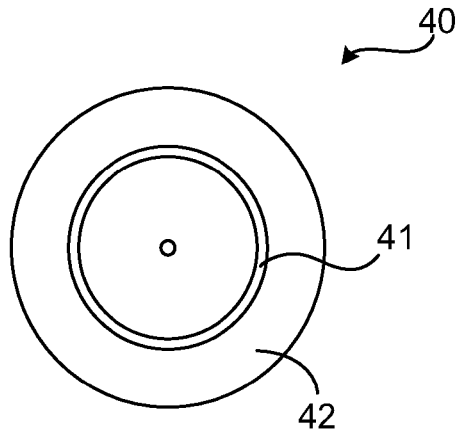
FIG. 4 is a schematic illustration of an embodiment of a computer program product of the present disclosure.

FIG. 4 illustrates a computer program product 40. The computer program product 40 comprises a computer readable medium 42 comprising a computer program 41 in the form of computer-executable components 41. The computer program/computer-executable components 41 may be configured to cause a device, e.g. the platform 2 or the radio device 5 as discussed herein, to perform an embodiment of the method of the present disclosure. The computer program/computer-executable components may be run on the processor circuitry 21 of the platform 2 or the processor circuitry 31 of the radio device 5 for causing the device to perform the method. The computer program product 40 may e.g. be comprised in a storage 26 or 36 comprised in the platform or radio device and associated with the processor circuitry 21 or 31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

FIG. 5a is a schematic flow chart of an embodiment of a method of the connectivity service platform 2, of the present disclosure. The platform 2 receives 50 a subscription change message comprising instructions for the connectivity service platform 2 to change from a currently enabled first subscription to a second subscription for providing a network connection to a radio device 5 comprising an eUICC 6. The message may e.g. be from the first MNO 7 or from the second MNO 8, both of which are customers for using the platform 2 and are thus able to control their respective subscriptions in the platform 2. Then, the platform 2 sends 51 a subscription change message to the radio device 5, comprising instructions for the radio device to change from the currently enabled first subscription to the second subscription for its network connection. Thus, the platform instructs the radio device 5 to perform the same subscription change as the platform has been instructed to perform by the receiving 50 of the subscription change message. The platform 2 enables 52 the second subscription within the connectivity service platform 2, in accordance with the received 50 instructions, thereby enabling the connectivity service platform 2 for communicating with the radio device 5 via the network connection from the second subscription of the radio device instead of from the first subscription. Then, the platform 2 tests 53 the second subscription network connection of the radio device 5 in accordance with a predefined testing procedure 27 by using the network connection from the second subscription for sending at least one test message to, and receiving at least one test message from, the radio device 5. These sent and received test messages are part of the test procedure 27 of the platform 2 and not part of regular signalling for trying to set up a network connection. After the exchange of test messages, the platform 2 verifies 54 that the second subscription network connection has passed the testing 53. Thus, the platform studies the results of the exchange of test messages and decides that the network connection of the second subscription functions sufficiently for proceeding with the subscription change. So far in the method, since the platform enabled 52 the second subscription, the platform has had both the first and second subscriptions enabled for the radio device 5. Then, the platform 2 disables 55 the first subscription within the connectivity service platform 2, after the verifying 54, thereby disabling the connectivity service platform 2 from communicating with the radio device 5 via the network connection from the first subscription of the radio device. Thereby, the change of subscription is complete with the second subscription enabled and providing a functioning network connection and the first subscription having been disabled without risking to loose network connectivity of the radio device 5.

FIG. 5b is a schematic flow chart of another embodiment of a method of the connectivity service platform 2, of the present disclosure. The steps of receiving 50, sending 51, enabling 52, testing 53, verifying 54, and disabling 55 are as discussed in relation to FIG. 5a. Further, the platform 2 may store 56 information about the predefined testing procedure 27, and may then send 57 a testing procedure message comprising information about the predefined testing procedure 27 to the radio device 5, before the testing 53. The platform 2 may thus inform the radio device about what testing, and optionally also what verification, procedure to use. Typically, the testing procedure 27 of the platform 2 is the same as the testing procedure 37 used by the radio device 5, but it is also possible to adapt the testing procedure 37 of the radio device to better suit the situation the radio device is in. In some embodiments, the platform 2 may receive 58 a verification message from the radio device 5, comprising information about that the second subscription network connection has passed a corresponding testing procedure 37 performed by the radio device, before the disabling 55 of the first subscription. Thus, the radio device may, after it has completed its testing procedure 37, inform the platform 2 that the second subscription, from the perspective of the radio device 5, appears to be ok. The platform 2 may then correlate this with its own finding from the testing 53 and verifying 54 to see that the second subscription has passed at both sides, giving an even stronger indication that it is safe to disable 55 the first subscription. Similarly, the platform 2 may send a verification message to the radio device 5.

FIG. 6a is a schematic flow chart of an embodiment of a method of the radio device 5, of the present disclosure. The radio device 5 receives 60 a subscription change message from the connectivity service platform 2, comprising instructions for the radio device 5 to change from the currently enabled first subscription to the second subscription for its network connection. The radio device 5 then acts upon the received 60 instructions by enabling 61 the second subscription within the radio device 5, thereby enabling the radio device 5 for communicating with the connectivity service platform 2 via the network connection from the second subscription of the radio device instead of from the first subscription. Then, in conformity with the method of the platform 2 discussed in relation to FIGS. 5a and 5b, the radio device tests 62 the second subscription network connection of the radio device 5 in accordance with a predefined testing procedure 37 by using the network connection from the second subscription for sending at least one test message to, and receiving at least one test message from, the connectivity service platform 2. These sent and received test messages are part of the test procedure 37 of the device 5 and not part of regular signalling for trying to set up a network connection. After the exchange of test messages, the radio device 5 verifies 63 that the second subscription network connection has passed the testing 62. Thus, the radio device studies the results of the exchange of test messages and decides that the network connection of the second subscription functions sufficiently for proceeding with the subscription change. So far in the method, since the radio device enabled 61 the second subscription, the radio device has had both the first and second subscriptions enabled. Then, the radio device disables 64 the first subscription within the radio device 5, after the verifying 63, thereby disabling the radio device 5 from communicating with the connectivity service platform 2 via the network connection from the first subscription of the radio device. Thereby, the change of subscription is complete with the second subscription enabled and providing a functioning network connection and the first subscription having been disabled without risking to loose network connectivity of the radio device 5.

FIG. 6*b* is a schematic flow chart of another embodiment of a method of the radio device 5, of the present disclosure. The steps of receiving 60, enabling 61, testing 62, verifying 63, and disabling 64 are as discussed in relation to FIG. 6*a*. Further, the radio device 5 may receive 65 a testing procedure message from the platform 2, comprising information about the predefined testing procedure 37, and the radio device may then store 66 the received 65 information about the predefined testing procedure 37, before the testing 62. In some embodiments, the radio device 5 receives 67 a verification message from the platform 2, comprising information about that the second subscription network connection has passed the corresponding testing procedure 27 performed by the connectivity service platform 2, before the disabling 64 of the first subscription. Thus, the platform 2 may, after it has completed its testing procedure 27, inform the radio device 5 that the second subscription, from the perspective of the platform 2, appears to be ok. The radio device 5 may then correlate this with its own finding from the testing 62 and verifying 63 to see that the second subscription has passed the testing at both sides, giving an even stronger indication that it is safe to disable 64 the first subscription. Similarly, the radio device 5 may send a verification message to the platform 2.

Figure 7:
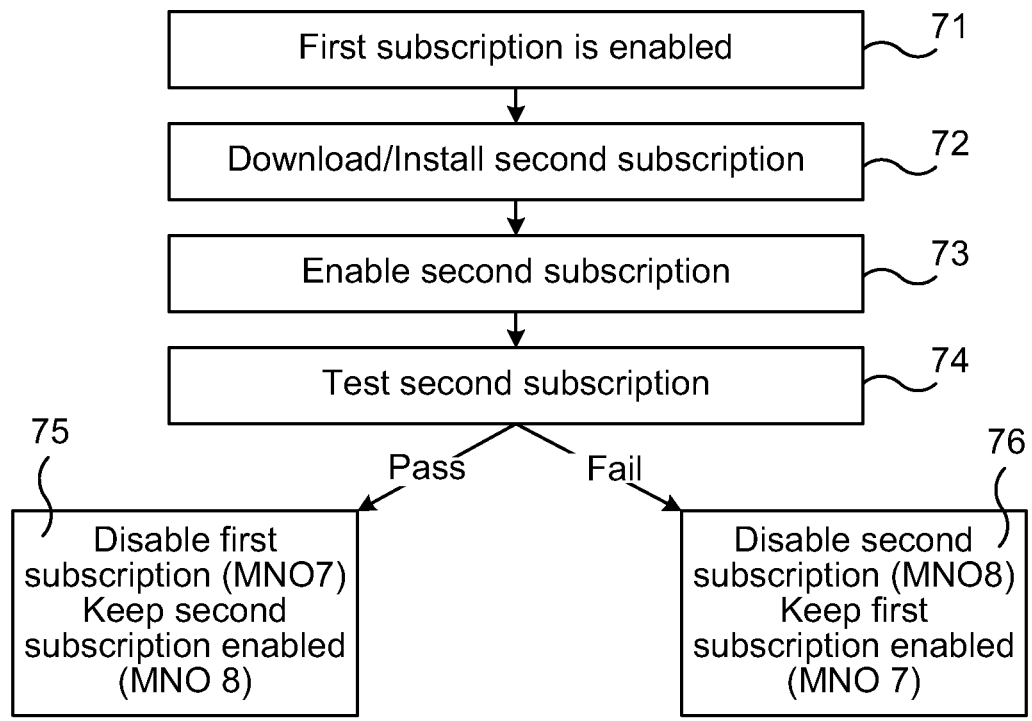
FIG. 7 is a schematic flow chart of exemplary embodiments of a method in a communication network, in accordance with the present disclosure.

FIG. 7 is a schematic flow chart of exemplary embodiments of a method in the communication network 1. The flow chart gives a more overall view of the methods discussed in respect of the FIGS. 5 and 6, from the perspective of the whole network 1, instead of from the perspective of either the platform 2 or the radio device 5. To begin with, the first subscription is enabled 71. This is the starting situation and the first subscription is enabled in both the radio device 5 and the platform 2. Then, the second subscription is downloaded and installed 72, after which the second subscription is enabled 73 in both the radio device 5 and the platform 2. Then, the testing 74 of the second subscription connection ensues, resulting in either a verified pass or a verified fail. If the second subscription passes the testing 74, then (both in the platform 2 and the radio device 5) the first subscription is disabled 75 while the second subscription is kept enabled. Conversely, if the second subscription fails the testing 74, then (both in the platform 2 and the radio device 5) the second subscription is disabled 76 while the first subscription is kept enabled.

Figure 8:
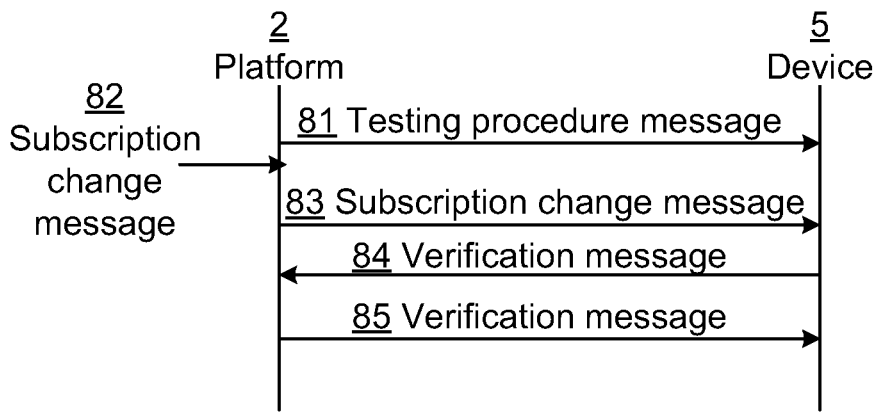
FIG. 8 is a schematic signalling diagram for an embodiment of the present disclosure.

FIG. 8 is a schematic signalling diagram for an embodiment of the present disclosure. Above, in respect of FIGS. 5 and 6, messages sent between the platform 2 and the radio device 5 have been discussed. In FIG. 8, these are illustrated in a signalling diagram. Thus, a testing procedure message 81 may be sent 57 by the platform 2 and received 65 by the radio device 5. A subscription change message 82 is received 50 by the platform 2 (this could be before or after sending 57 the testing procedure message 81). In response to the received 50 subscription change message 82, the platform 2 sends 51 and the radio device 5 receives 60 a subscription change message 83. Then, both the platform 2 and the radio device 5 will perform the testing 53/62 and verifications 54/63 discussed herein, after which the radio device 5 may send and the platform 2 may receive 58 a verification message 84, before, after or at the same time as which the platform 2 may send and the radio device 5 may receive 67 a verification message 85.

Example 1

Provided is a eUICC 6 subscription change process with a testing procedure before real subscription change from first MNO 7 to second MNO 8 (i.e. after MNO 8 second subscription is enabled, test MNO 8 subscription first before disabling MNO 7 first subscription). It is detected and determined when the platform 2 and eUICC 6 can disable the first MNO 7 subscription. Before disabling the first subscription, during the subscription change process, on both the radio device/eUICC side and the platform side:

Execute the predefine test procedure including Attach, Location Update, mobile originated (MO)/mobile terminated (MT) short message service (SMS), general packet radio service (GPRS) uplink (UL) and downlink (DL) data, etc. in order to test 53/62 if the second subscription is working well, if working well then the first subscription is disabled 55/64. If not, then the second subscription is disabled 76 while keeping the first subscription enabled.

The radio device 5 will not keep dual radio interfaces at the same time. It only uses the second enabled subscription to attach to the network 1 to test the new connectivity. So even though the first subscription is still enabled, it is not used (attached) when the new IMSI is used (attached). Once the test has passed, the first enabled subscription is disabled.

A fall-back mechanism may apply to any time in the eUICC 6 lifecycle. Whenever there is connectivity failure during the lifecycle it may be possible to fall-back to an available subscription e.g. the provisioning subscription, but the testing procedure 27/37 only applies after the second subscription is installed and enabled 52/61 and it is requires to execute the test procedure before disabling 55/64 the first subscription. The test procedure 27/37 is only executed after the second subscription is installed and enabled 52/61, and will not be executed anymore during the lifecycle once the second subscription has been verified 54/63 and passed the test procedure. Therefore, the test procedure only applies during the subscription change process, while the fall-back procedure may always be active during the whole eUICC 6 lifecycle to make sure it is possible to fall-back anytime during the whole eUICC lifecycle.

Example 2

Figure 9:
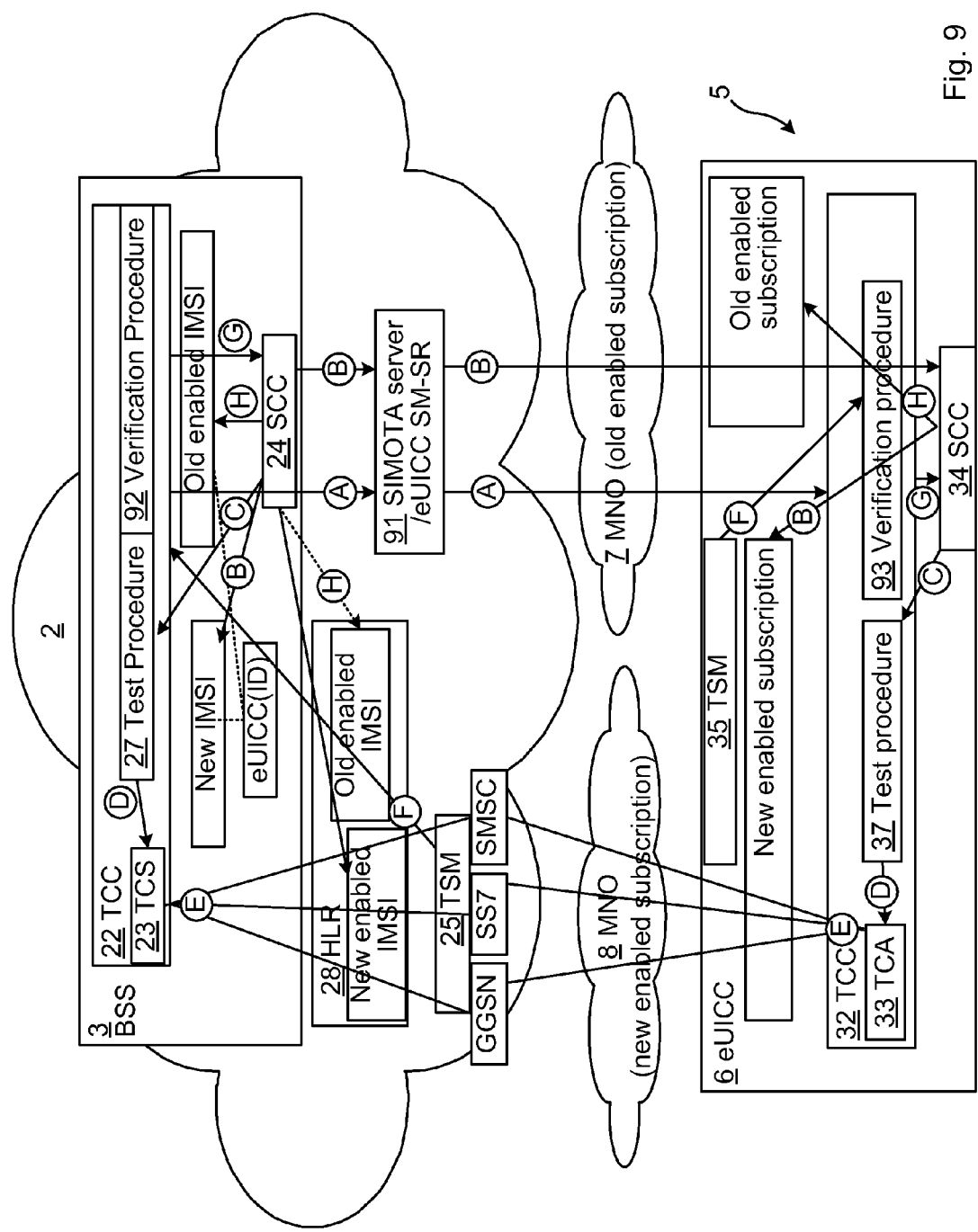
FIG. 9 is a schematic block diagram illustrating example embodiments of the present disclosure.

With reference to FIG. 9, example methods will now be discussed in more detail.

Step A

The test connectivity component (TCC) 22 in the platform 2 BSS 3 defines the testing procedure 27 and a verification procedure 92, and the testing connectivity server (TCS) 23 then sends 57 the defined testing procedure and verification procedure and testing server address to the test connectivity component (TCC) 32 in eUICC 6 of the radio device 5, by SIM provisioning by over-the-air (SIMOTA) eUICC subscription manager-secure routing (SM-SR), server 91 via the current enabled connectivity (MNO 7 first subscription/international mobile subscriber identity (IMSI) connectivity).

Test Connectivity Server (TCS) 23 is a server for testing MO/MT (Mobile originated/Mobile terminated) SMS, UL/DL (Uplink/Downlink) data, etc.

The test procedure 27/37 (can include but is not restricted to the following steps).
1. Device 5 initiated: Attach request (incl. authentication request)
2. Device 5 initiated: Location update request
3. Device 5 initiated: MO SMS (Mobile Originated SMS) to test server 23
4. Device 5 initiated: outgoing call to test Server 23 (optional)
5. Device 5 initiated: Create Packet data protocol (PDP) context request
6. Device 5 initiated: PDP context activation request
7. Device 5 initiated: transfer UL/DL Data to/from Test server 23
8. Network 1/platform 2 initiated: MT SMS (triggered by test server 23) (Mobile Terminated SMS) from test server 23
9. Network 1/platform 2 initiated: incoming call (triggered by test server 23) (optional)
10. Network 1/platform 2 initiated: Insert Subscriber Data (triggered by platform 2 HLR 28)
11. Network 1/platform 2 initiated: Cancel Location (triggered by platform 2 HLR 28)

Verification Procedure 92/93:

If all the test operations passed successfully without any failure or rejection message regarding the MNO 8 second subscription (IMSI/Mobile Subscriber Integrated Services Digital Network (ISDN) Number (MSISDN)), it verifies that the second subscription/connectivity works well, and the verification result of the second subscription is "Passed".

If there is any failure or rejection message received during the testing procedure 27/37, the verification result of the second subscription is "Failed".

It may be possible to perform the test procedure 27/37 several times if the failure reason is due to a temporary network failure e.g. delay, poor coverage, weak signal, congestion, etc., and the verification result will then be the result of the latest test.

Step B

The subscription change component (SCC) 24 in the platform 2 BSS 3 receives 50 the subscription change request 82 to change the enabled subscription from the first subscription to the second subscription.

The SCC 24 and the HLR 28 will enable 52 the second subscription. However, they shall not disable first subscription at this stage. So MNO 7 first subscription/IMSI is still enabled in the platform 2.

SCC 24 in BSS 3 shall notify the eUICC 6 SCC 34 via SIMOTA (eUICC SM-SR) server 91 to change the subscription from first (enabled) subscription of MNO 7 to the second (new) subscription (IMSI) of MNO 8, via the first subscription connectivity.

SCC 34 in eUICC 6 enables 61 the second subscription. However is shall not disable the first subscription at this stage. So MNO 7 first subscription/IMSI is still enabled in eUICC 6.

Step C

On both eUICC 6 and platform 2 (network) side: SCC 24/34 shall notify TCC 22/32 to start 53/62 testing procedure 27/37 of the second subscription.

Step D

On both eUICC 6 and platform 2 (network) side: TCC 22/32 starts 53/62 the testing procedure of the second subscription, according to testing procedure 27/37 predefined in Step A.

Test Procedure 37 in eUICC 6 TCC 32 shall notify the testing connectivity application (TCA) 33 to use the second subscription (IMSI/MSISDN) to attach to the network 1, and send Mobile Originated signalling and traffic request to the TCS 23 according to the predefined testing procedure 37, while still keeping the first subscription enabled but not used.

Test Procedure 27 in the platform 2 TCC 22 shall notify the TCS 23 to use the second subscription (IMSI/MSISDN) to send Mobile Terminated signalling and traffic request to the radio device 5/eUICC 6 according to the predefined testing procedure 27, while still keeping the first subscription enabled but not used.

Step E

Testing procedure starts 53/62 on both radio device 5 side and platform 2 (network) side, with the pre-defined testing procedure 27/37 in Step A. On platform 2, the traffic and signalling monitor (TSM) 25 starts monitoring the signalling and traffic log, while on the radio device 5 (eUICC) side the TSM 35 starts monitoring the signalling and traffic log.

The radio device 5 detaches from network 1 with the first subscription/IMSI and reattaches to the network using the second subscription/IMSI (in this case both MNO 7 IMSI and MNO 8 IMSI are enabled at the same time on eUICC 6 during the subscription change process, however device/eUICC shall always only use the latest enabled subscription/IMSI to attach to network 1, i.e. the MNO 8 IMSI will be attached to network 1, MNO 7 IMSI will be detached). TSM 35 in eUICC 6 starts to monitor the ongoing signalling flow and traffic flow with MNO 8 IMSI/MSISDN, on the radio device side.

The radio device 5 shall perform signalling requests and traffic requests according to predefined testing procedure 37, using MNO 8 IMSI/MSISDN, e.g.:
  Attach request (incl. authentication request)
  Location Update request
  MO SMS
  PDP activation request
  Transfer UL/DL data Meanwhile, on the platform 2 (network) side the TSM 25, possibly in a platform 2 probe, starts to monitor the ongoing signalling flow and traffic flow for all signalling and traffic using the MNO 8 IMSI/MSISDN.

The platform 2 shall perform signalling requests and traffic requests according to predefined testing procedure, using MNO 8 IMSI/MSISDN, e.g.:
  MT SMS
  Insert Subscriber Data request
  Cancel Location request Step F On both eUICC 6 and platform 2 (network) side: TCC 22/32 acquires the real-time traffic and signalling log from the TSM 25/35, in order to verify 54/63 whether the second subscription (MNO 8 IMSI) works well or not, according to the predefined verification procedure 27/37 in Step A.

After the testing procedure has finished (Note that testing procedure could be executed several times due to temporary network failures, in which case only the final test result is counted), if the TSM 25/35 log has reported no failure or rejection message regarding MNO 8 IMSI/MSISDN, the verification result of the second subscription and connectivity is "Pass".

If there is any failure or rejection message during the testing procedure from the TSM 25/35 log, the verification result of the second subscription is "Fail".

Note (Additional steps for guarantee synchronized verification result):

In rare cases, there may be different testing result (pass or fail) from mobile device side and from platform (network) side, so one side could be "Failure" and the other side could be "Pass". In order to avoid the discrepancy, an additional step may be executed to synchronize the verification 54/63 result between eUICC 6 and platform 2:

After testing 53/62 and verification 54/63 procedure is finished, the verification result shall be stored on both eUICC 6 and platform 2 sides. Both eUICC 6 and platform 2 shall disconnect from the second subscription, and reconnect again via the first subscription. The verification result shall be synchronized between eUICC 6 and platform 2 (via SIMOTA server 91), if either side is "Fail", the final verification result on both eUICC and platform side shall be "Fail", no matter if the other side result is "Pass" or "Fail". This may be done by exchange of the verification messages 84 and/or 85.

Step G

On both eUICC 6 and platform 2 (network) side:

In case the verification result is "Pass": TCC 22/32 notifies the SCC 24/34 to disable the first subscription of MNO 7. The second subscription of MNO 8 remains enabled in both eUICC 6 and platform 2.

In case the verification result is "Fail": TCC 22/32 notifies the SCC 24/34 to disable the second subscription of MNO 8. The first subscription of MNO 7 remains enabled in both eUICC 6 and platform 2.

Step H

On both eUICC 6 and platform 2 (network) side:

In case the verification result is "Pass": SCC 24/34 disables 55/64 the first subscription. The second subscription remains enabled in both eUICC and the platform, and shall be active, i.e. eUICC 6 shall remain attached to network 1 with MNO 8 second subscription, or shall reattach to network 1 with MNO 8 second subscription if the radio device 5 is in detached mode or is attached with the first subscription.

In case the verification result is "Failed": SCC 24/34 disables the second subscription, and keeps the first subscription enabled. The MNO 7 connectivity shall be active, i.e. eUICC 6 shall remain attached to network 1 with the first subscription, or shall reattach to network 1 with the first subscription if the radio device 5 is in detached mode or is attached with the second subscription.

Below follow some other aspects of the present disclosure.

According to an aspect of the present disclosure, there is provided a connectivity service platform 2 for a communication network 1. The connectivity service platform 2 comprises means (e.g. the processor circuitry 21, such as the SCC 24) for receiving 50 a subscription change message 82 comprising instructions for the connectivity service platform 2 to change from a currently enabled first subscription to a second subscription for providing a network connection to a radio device 5 comprising an eUICC 6. The connectivity service platform 2 also comprises means (e.g. the processor circuitry 21, such as the SCC 24, in cooperation with the communication interface 29) for sending 51 a subscription change message 83 to the radio device 5, comprising instructions for the radio device to change from the currently enabled first subscription to the second subscription for its network connection. The connectivity service platform 2 also comprises means (e.g. the processor circuitry 21, such as the SCC 24) for enabling 52 the second subscription within the connectivity service platform 2, thereby enabling the connectivity service platform 2 for communicating with the radio device 5 via the network connection from the second subscription of the radio device instead of from the first subscription. The connectivity service platform 2 also comprises means (e.g. the processor circuitry 21, such as the TCC 22) for testing 53 the second subscription network connection of the radio device 5 in accordance with a predefined testing procedure 27 by using the network connection from the second subscription for sending at least one test message to, and receiving at least one test message from, the radio device. The connectivity service platform 2 also comprises means (e.g. the processor circuitry 21, such as the TCC 22) for verifying 54 that the second subscription network connection has passed the testing 53. The connectivity service platform 2 also comprises means (e.g. the processor circuitry 21, such as the SCC 24) for disabling 55 the first subscription within the connectivity service platform 2, thereby disabling the connectivity service platform 2 from communicating with the radio device 5 via the network connection from the first subscription of the radio device.

According to another aspect of the present disclosure, there is provided a radio device 5 for a communication network 1. The radio device comprises an eUICC 6. The radio device 5 also comprises means (e.g. the processor circuitry 31, such as the SCC 34, in cooperation with the radio communication interface 39) for receiving 60 a subscription change message 83 from a connectivity service platform 2, comprising instructions for the radio device 5 to change from the currently enabled first subscription to the second subscription for its network connection. The radio device 5 also comprises means (e.g. the processor circuitry 31, such as the SCC 34) for enabling 61 the second subscription within the radio device 5, thereby enabling the radio device 5 for communicating with the connectivity service platform 2 via the network connection from the second subscription of the radio device instead of from the first subscription. The radio device 5 also comprises means (e.g. the processor circuitry 31, such as the TCC 32) for testing 62 the second subscription network connection of the radio device 5 in accordance with a predefined testing procedure 37 by using the network connection from the second subscription for sending at least one test message to, and receiving at least one test message from, the connectivity service platform 2. The radio device 5 also comprises means (e.g. the processor circuitry 31, such as the TCC 32) for verifying 63 that the second subscription network connection has passed the testing 62. The radio device 5 also comprises means (e.g. the processor circuitry 31, such as the SCC 34) for disabling 64 the first subscription within the radio device 5, thereby disabling the radio device 5 from communicating with the connectivity service platform 2 via the network connection from the first subscription of the radio device.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a connectivity service platform in a communication network, the method comprising:

receiving a subscription change message comprising instructions for the connectivity service platform to change from a currently enabled first subscription to a second subscription for providing a network connection to a radio device comprising an embedded Universal Integrated Circuit Card, eUICC;

sending a subscription change message to the radio device, comprising instructions for the radio device to change from the currently enabled first subscription to the second subscription for its network connection;

enabling the second subscription within the connectivity service platform, thereby enabling the connectivity service platform for communicating with the radio device via the network connection from the second subscription of the radio device instead of from the first subscription;

testing the second subscription network connection of the radio device in accordance with a predefined testing procedure by using the network connection from the second subscription for sending at least one test message to, and receiving at least one test message from, the radio device;

verifying that the second subscription network connection has passed the testing; and disabling the first subscription within the connectivity service platform, after the verifying, thereby disabling the connectivity service platform from communicating with the radio device via the network connection from the first subscription of the radio device.

2. The method of claim 1, further comprising:

storing information about the predefined testing procedure; and sending a testing procedure message comprising information about the predefined testing procedure to the radio device;

before the testing.

3. The method of claim 1, further comprising:

receiving, from the radio device, a verification message comprising information about that the second subscription network connection has passed a corresponding testing procedure performed by the radio device;

before the disabling of the first subscription.

4. The method of claim 1, wherein the first subscription is with a first network operator, and the second subscription is with a second network operator, different than a first network operator.

5. The method of claim 1, wherein the test messages comprises at least one of: downlink SMS message, uplink SMS message, downlink data message, uplink data message, and message for setting up a voice call.

6. A connectivity service platform for a communication network, the platform comprising;

a communication interface comprising a transmitter and a receiver for communicating with a radio device over the communication network; and processor circuitry configured to:

receive a subscription change message comprising instructions for the connectivity service platform to change from a currently enabled first subscription to a second subscription for providing a network connection to the radio device comprising an embedded Universal Integrated Circuit Card, eUICC;

send a subscription change message to the radio device, comprising instructions for the radio device to change from the currently enabled first subscription to the second subscription for its network connection;

enable the second subscription within the connectivity service platform, thereby enabling the connectivity service platform for communicating with the radio device via the network connection from the second subscription of the radio device instead of from the first subscription;

test the second subscription network connection of the radio device in accordance with a predefined testing procedure by using the network connection from the second subscription for sending at least one test message to, and receiving at least one test message from, the radio device;

verify that the second subscription network connection has passed the testing; and disable the first subscription within the connectivity service platform, after the verifying, thereby disabling the connectivity service platform from communicating with the radio device via the network connection from the first subscription of the radio device.

7. A non-transitory computer readable medium storing computer program code that, when run on processor circuitry of a connectivity service platform in a communication network, causes the connectivity service platform to:

receive a subscription change message comprising instructions for the connectivity service platform to change from a currently enabled first subscription to a second subscription for providing a network connection to a radio device comprising an embedded Universal Integrated Circuit Card, eUICC;

send a subscription change message to the radio device, comprising instructions for the radio device to change from the currently enabled first subscription to the second subscription for its network connection;

enable the second subscription within the connectivity service platform, thereby enabling the connectivity service platform for communicating with the radio device via the network connection from the second subscription of the radio device instead of from the first subscription;

test the second subscription network connection of the radio device in accordance with a predefined testing procedure by using the network connection from the second subscription for sending at least one test message to, and receiving at least one test message from, the radio device;

verify that the second subscription network connection has passed the testing; and disable the first subscription within the connectivity service platform, after the verifying, thereby disabling the connectivity service platform from communicating with the radio device via the network connection from the first subscription of the radio device.

8. A method performed by a radio device in a communication network and comprising an embedded Universal Integrated Circuit Card, eUICC, the method comprising:

receiving a subscription change message from a connectivity service platform, comprising instructions for the radio device to change from the currently enabled first subscription to the second subscription for its network connection;

enabling the second subscription within the radio device, thereby enabling the radio device for communicating with the connectivity service platform via the network connection from the second subscription of the radio device instead of from the first subscription;

testing the second subscription network connection of the radio device in accordance with a predefined testing procedure by using the network connection from the second subscription for sending at least one test message to, and receiving at least one test message from, the connectivity service platform;

verifying that the second subscription network connection has passed the testing; and disabling the first subscription within the radio device, after the verifying, thereby disabling the radio device from communicating with the connectivity service platform via the network connection from the first subscription of the radio device.

9. The method of claim 8, further comprising:

receiving a testing procedure message comprising information about the predefined testing procedure from the connectivity service platform; and storing the received information about the predefined testing procedure;

before the testing.

10. The method of claim 8, further comprising:
receiving, from the connectivity service platform, a verification message comprising information about that the second subscription network connection has passed the corresponding testing procedure performed by the connectivity service platform;
before the disabling of the first subscription.

11. The method of claim 8, wherein the first subscription is with a first network operator, and the second subscription is with a second network operator, different than a first network operator.

12. The method of claim 8, wherein the test messages comprises at least one of: downlink SMS message, uplink SMS message, downlink data message, uplink data message, and message for setting up a voice call.

13. A radio device for a communication network, the radio device comprising:
an embedded Universal Integrated Circuit Card, eUICC;
processor circuitry; and
storage storing instructions that, when executed by the processor circuitry, cause the radio device to:
receive a subscription change message from a connectivity service platform, comprising instructions for the radio device to change from the currently enabled first subscription to the second subscription for its network connection;
enable the second subscription within the radio device, thereby enabling the radio device for communicating with the connectivity service platform via the network connection from the second subscription of the radio device instead of from the first subscription;
test the second subscription network connection of the radio device in accordance with a predefined testing procedure by using the network connection from the second subscription for sending at least one test message to, and receiving at least one test message from, the connectivity service platform;
verify that the second subscription network connection has passed the testing; and
disable the first subscription within the radio device, after the verifying, thereby disabling the radio device from communicating with the connectivity service platform via the network connection from the first subscription of the radio device.

14. A non-transitory computer readable medium storing computer program code that, when run on processor circuitry of a radio device in a communication network and comprising an eUICC, causes the radio device to:
receive a subscription change message from a connectivity service platform, comprising instructions for the radio device to change from the currently enabled first subscription to the second subscription for its network connection;
enable the second subscription within the radio device, thereby enabling the radio device for communicating with the connectivity service platform via the network connection from the second subscription of the radio device instead of from the first subscription;
test the second subscription network connection of the radio device in accordance with a predefined testing procedure by using the network connection from the second subscription for sending at least one test message to, and receiving at least one test message from, the connectivity service platform;
verify that the second subscription network connection has passed the testing; and
disable the first subscription within the radio device, after the verifying, thereby disabling the radio device from communicating with the connectivity service platform via the network connection from the first subscription of the radio device.

\* \* \* \* \*